(12) United States Patent
Waful et al.

(10) Patent No.: US 11,748,380 B1
(45) Date of Patent: Sep. 5, 2023

(54) AGGREGATED APPLICATION DATA STORE

(71) Applicant: UIPCO, LLC, San Antonio, TX (US)

(72) Inventors: Christopher James Waful, San Antonio, TX (US); Brennen Michael Ricks, San Antonio, TX (US); Kathryn Babb, San Antonio, TX (US); Curtis Mark Bell, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 730 days.

(21) Appl. No.: 16/809,297

(22) Filed: Mar. 4, 2020

Related U.S. Application Data

(60) Provisional application No. 62/815,771, filed on Mar. 8, 2019.

(51) Int. Cl.
*G06F 16/28* (2019.01)
*G06F 40/174* (2020.01)
*G06Q 10/10* (2023.01)
*H04L 9/40* (2022.01)

(52) U.S. Cl.
CPC .......... *G06F 16/283* (2019.01); *G06F 16/285* (2019.01); *G06F 40/174* (2020.01); *G06Q 10/10* (2013.01); *H04L 63/083* (2013.01)

(58) Field of Classification Search
CPC .... G06F 16/283; G06F 16/285; G06F 40/174; G06Q 10/10; H04L 63/083
See application file for complete search history.

(56) References Cited

U.S. PATENT DOCUMENTS

| | | | | |
|---|---|---|---|---|
| 10,732,952 | B1* | 8/2020 | Yu | G06F 8/64 |
| 2008/0215976 | A1* | 9/2008 | Bierner | G06Q 99/00 |
| | | | | 715/708 |
| 2012/0317652 | A1* | 12/2012 | Kiley | H04L 67/306 |
| | | | | 715/234 |
| 2013/0066988 | A1* | 3/2013 | Levinson | G06Q 10/107 |
| | | | | 709/206 |
| 2014/0075004 | A1* | 3/2014 | Van Dusen | G06Q 50/01 |
| | | | | 709/223 |
| 2014/0108043 | A1* | 4/2014 | Ach | G16H 10/60 |
| | | | | 705/3 |
| 2014/0122988 | A1* | 5/2014 | Eigner | G06F 16/285 |
| | | | | 715/226 |

(Continued)

*Primary Examiner* — Scott T Baderman
*Assistant Examiner* — Mario M Velez-Lopez
(74) *Attorney, Agent, or Firm* — PERKINS COIE LLP (57) ABSTRACT

Data processing techniques are described to obtain user data previously collected when a user is requested to complete application forms associated with multiple servers. The application forms may include some fields that may be in common and that may request the same user data. For each application form requested by the user, the data processing techniques can identify and obtain the relevant previously collected data about the user for the application form. The application form for a product can have certain fields that may be pre-filled based on the relevant and/or non-confidential previously collected user data. The data processing techniques can also provide an estimate of the time that may be needed by the user to complete at least one application form so that the user can obtain a requested product.

15 Claims, 8 Drawing Sheets

(56) References Cited

U.S. PATENT DOCUMENTS

| | | | |
|---|---|---|---|
| 2014/0122989 A1* | 5/2014 | Eigner | G06F 16/355 |
| | | | 715/226 |
| 2014/0244317 A1* | 8/2014 | Roberts | G06Q 40/08 |
| | | | 705/4 |
| 2016/0239488 A1* | 8/2016 | Aguilon | G06F 16/93 |
| 2021/0103982 A1* | 4/2021 | Chen | G06Q 40/03 |
| 2021/0133645 A1* | 5/2021 | Tazi | G06F 40/174 |
| 2021/0390154 A1* | 12/2021 | Wagner | G06Q 50/205 |

* cited by examiner

FIG. 1

*Prior Art*

AGGREGATED APPLICATION DATA STORE

CROSS-REFERENCE TO RELATED APPLICATIONS

This application is a non-provisional of and claims priority to U.S. Provisional Application No. 62/815,771, filed on Mar. 8, 2019, entitled "AGGREGATED APPLICATION DATA STORE," which is hereby incorporated by reference in its entirety for all purposes.

TECHNICAL FIELD

This disclosure is directed generally to methods and apparatus for aggregated data processing.

BACKGROUND

Large companies or organizations can have several subsidiaries or departments with employees within each subsidiary or department. In many cases, employees from one subsidiary or department may work independently from employees from another subsidiary or department. Such independence may be beneficial in some projects but not in other projects. For example, a first group of employees within one subsidiary or department may design a system to offer a first product to a user by requesting some information from the user. However, a second group of employees within another subsidiary or department of the same company may design a system to offer a second product to the user by requesting at least some of the information already requested for the first product and perhaps obtained by the company. While the two groups of employees may operate independently, the user is requested to enter at least some of the information twice, leading to a less positive customer experience, particularly when the user views the products as originating from one company.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

This patent document describes data processing techniques where user data previously collected by a company, organization, or institution can be obtained when a user requests two or more products from the same company, organization, or institution. For each requested product, the data processing techniques can identify and obtain the relevant previously collected user data for an application form for each product. In some embodiments, the relevant previously collected user data can only be obtained if such data is considered non-confidential or non-sensitive. Thus, a benefit of the disclosed technology is that an application form for a product can have certain fields that may be pre-filled based on the relevant and/or non-confidential previously collected user data. Furthermore, the data processing techniques can provide an estimate of the time that likely will be needed by the user to complete at least one application form so that the user can obtain the requested product. The time estimate can be based in part on the relevant previously collected user data that can be obtained. The data processing techniques can also provide an estimate of the time that may be needed by the user to complete at least one additional application form for at least one additional product.

Figure 1:
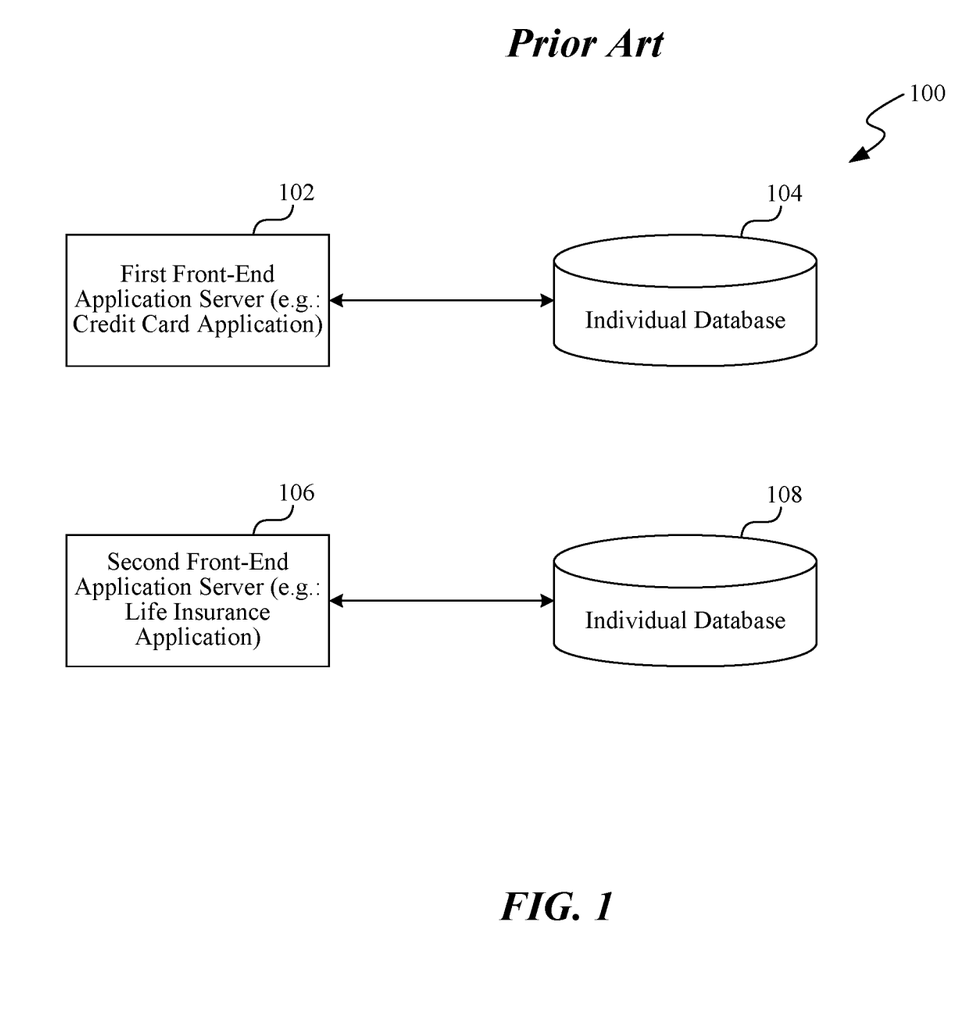
FIG. 1 shows a block diagram of a conventional system designed to offer two products to users.

FIG. 1 shows a block diagram of a conventional system designed to offer two products to users. The conventional system 100 includes two servers 102, 106 and two individual databases 104, 108. The two servers 102 and 106 are configured to operate as applications servers to send, for example, a credit card application form and life insurance form to user devices of the users. The first server 102 can obtain information from and/or store information to its individual database 104. Likewise, the second server 104 can obtain information from and/or store information to its individual database 108. In other words, the first server 102 may not be able to obtain information stored on the individual database 108, and the second server 106 may not be able to obtain information stored on the individual database 104. Such a conventional system 100 is not uncommon at least because a company, organization, or institution can have several subsidiaries or department, where each subsidiary or department may independently operate servers 102, 106 and their corresponding databases 104, 108. As a result, the servers 102, 106 of the conventional system 100 may request the same or similar information from a user that wants products (e.g., credit card and life insurance) offered by the two servers. Thus, as illustrated in FIG. 1, information about a user can be siloed into different databases, where two or more databases may not be accessible by a server or group of servers.

The embodiments described in this patent document describe data processing techniques. For example, in Section I below, this patent document describes methods to enable data processing using an aggregated application data store system. In Section II, this patent document describes techniques to determine an estimate of the time that likely will be needed by the user to complete an application form that may be requested by the user. In Section III, this patent document describes graphical user interface (GUI) to provide relevant information that can allow the user to determine what information is needed from the user for an application and how much time the user may have to spend to complete the application. The example headings for the various sections below are used to facilitate the understanding of the disclosed subject matter and do not limit the scope of the claimed subject matter in any way. Accordingly, one or more features of one example section can be combined with one or more features of another example section.

I. Aggregated Application Data Store System

Figure 2:
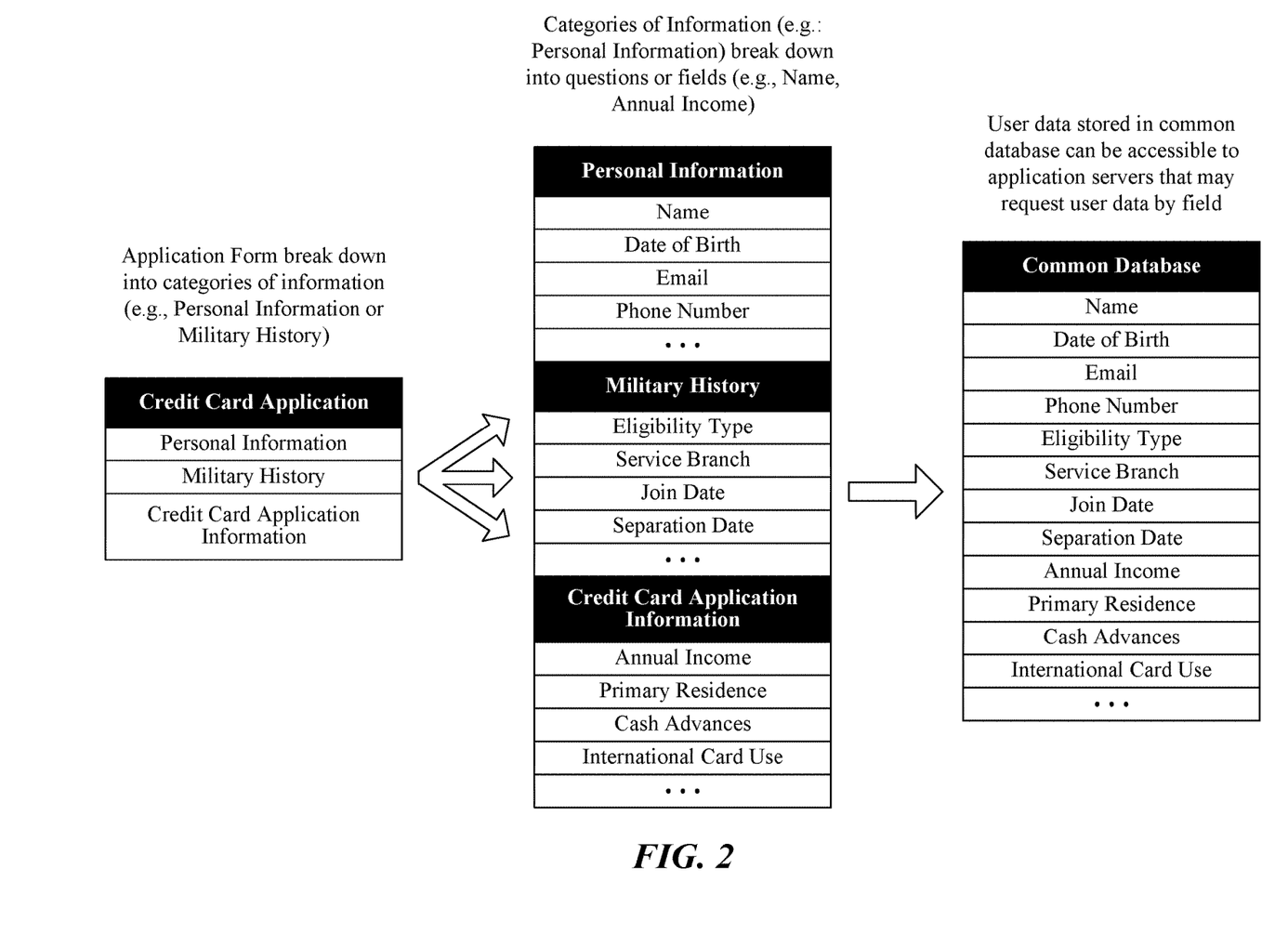
FIG. 2 shows an example of data management system that can be part of an aggregated application data store system.
Figure 3:
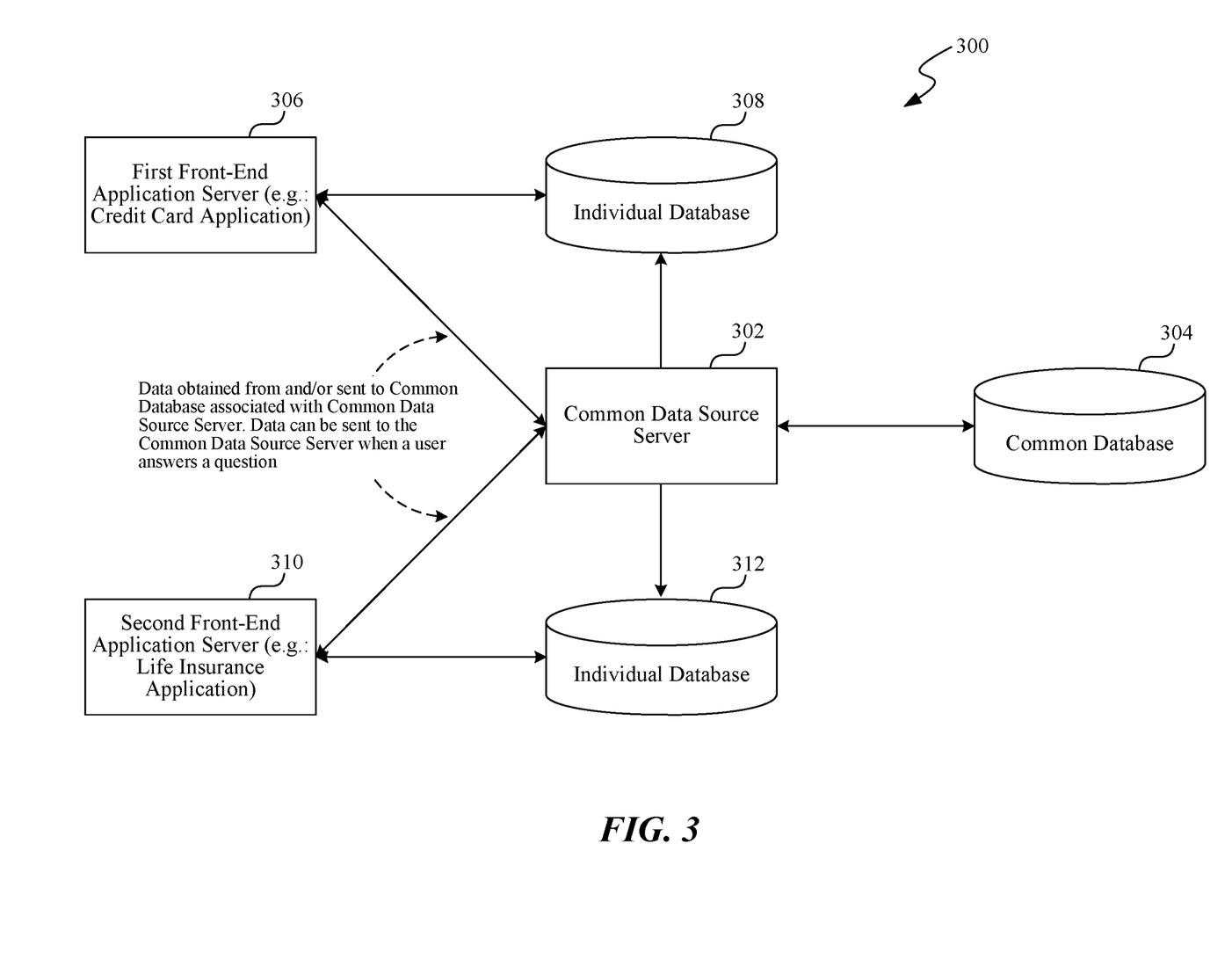
FIG. 3 shows an example of an aggregated application data store system.

FIG. 2 shows an example data management system that can be part of an aggregated application data store system (described in FIG. 3). The data management system is designed to overcome at least some of the drawbacks of the conventional system described in FIG. 1. The left-hand side of FIG. 2 illustrates an example of an application form for a product (e.g., a credit card application), where the application form includes three categories of information: personal information, military history, and credit card application information. In the middle of FIG. 2, each category of information is shown to include fields. For example, the personal information category includes the following fields: name, date of birth, email address, phone number, etc., The data management system can store the user data associated with the fields in a common database, where multiple servers may use the data processing techniques described in this patent document to retrieve the relevant previously collected user data from the common database.

FIG. 3 shows an example of an aggregated application data store system 300. The system 300 includes a common data source server 302 and its associated common database 304. The common database 304 may a plurality of data for each user, where each data is stored with a field that describes the data. For example, a field "name" may be associated with a user data "John Smith." Thus, the common database 304 can store user data for the fields as described in FIG. 2. Furthermore, the common database 304 may associate the user data for the fields with identifying information about the user so that the common data source server 302 can obtain user data based on the identifying information. For example, the common data source server 302 may receive an identifying information about a user such as the user's login and password, and obtain or determine a user data and a corresponding field associated with the identifying information.

A benefit of using a common data source server 302 (as shown in FIG. 3) with the data management system (as described in FIG. 2) is that a plurality of servers can obtain relevant information about a user from common data source server 302. The obtained information can be used by the plurality of servers to pre-fill certain fields on applications forms for products requested by the user. Thus, as shown in FIG. 3, the common data source server 302 can communicate with the first and second servers 306, 310 via a network, such as the Internet or Intranet to provide relevant previously collected user data. Continuing with the example described in FIG. 1, the first server 306 may be an application server for requesting and processing user data to provide a credit card product to the user, and the second server 310 may be an application server for requesting and processing user data to provide a life insurance product to the user. The first and second servers 306, 310 can send user data to and obtain user data from their respective individual database 308, 312. However, unlike in FIG. 1, in FIG. 3 the common data source server 302 can send relevant previously collected user data to the individual databases 308, 312. In some embodiments, the common data source server 302 can send the relevant previously collected user data to the individual databases 308, 312 when their respective servers 306, 310 request the common data source server 302 to send such information.

Each of the first front-end application server 306 and second front-end application server 310 and can be configured to perform a same or similar set of operations using information provided by a common data source server 302. By having two or more servers perform at least some common set of operation with a common data source server 302, the two or more servers can advantageously obtain relevant previously collected user data from the common database 304. While this patent document describes that each of the first and second servers 306, 310 perform a set of operations, the first and second servers 306, 310 may not perform the described set of operations at the same time or within a same time period; the first and second servers 306, 310 may not both receive a same information from and/or send a same information to a user device or a common data source server 302; and the first and second servers 306, 310 may separately or independently perform the described operations. Additionally, although only two application servers (306, 310) are depicted in FIG. 3, any number of application servers can be communicatively connected to common data source server 302.

In FIG. 3, the first and second servers 306, 310 can receive, from a user device, identifying information about a user (e.g., a password and/or login), and an indication that the user is beginning an application for a product. For example, a user on a laptop may click a button on a website to request a credit card from a company. By clicking on the button, the laptop can send an indication to the first server 306 that the user requests a credit card application for a credit card product. In another example, if the same user later decided to obtain a life insurance product from the same company or a related subsidiary, the user on the laptop may click a button on a website and the laptop can send another indication to the second server 310 that the user requests a life insurance application for a life insurance product.

As shown in FIG. 3, each of the first and second servers can obtain relevant previously collected user data from the common database 304 via the common data source server 302. Each of the first and second servers can store a plurality of categories of information to obtain about a user if the user requests an application for a product. The plurality of categories of information is related to the application requested by the user, and each category of information includes fields that is also stored by each of the first and second servers. For example, if a user wants to obtain a credit card product, a plurality of categories of information related to credit card product may be personal information, military history, and credit card application information (as shown in FIG. 2), where each the three categories of information includes fields (e.g., fields for personal information include name, date of birth, email, etc.). In another example, if a user wants to obtain a life insurance product, a plurality of categories of information related to life insurance product may be personal information, military history, health information, and beneficiary information, where each the four categories of information includes fields (e.g., fields for beneficiary information include beneficiary's name, beneficiary's social security number, etc.). In some embodiments, a category of information may include a single field.

Figure 4:
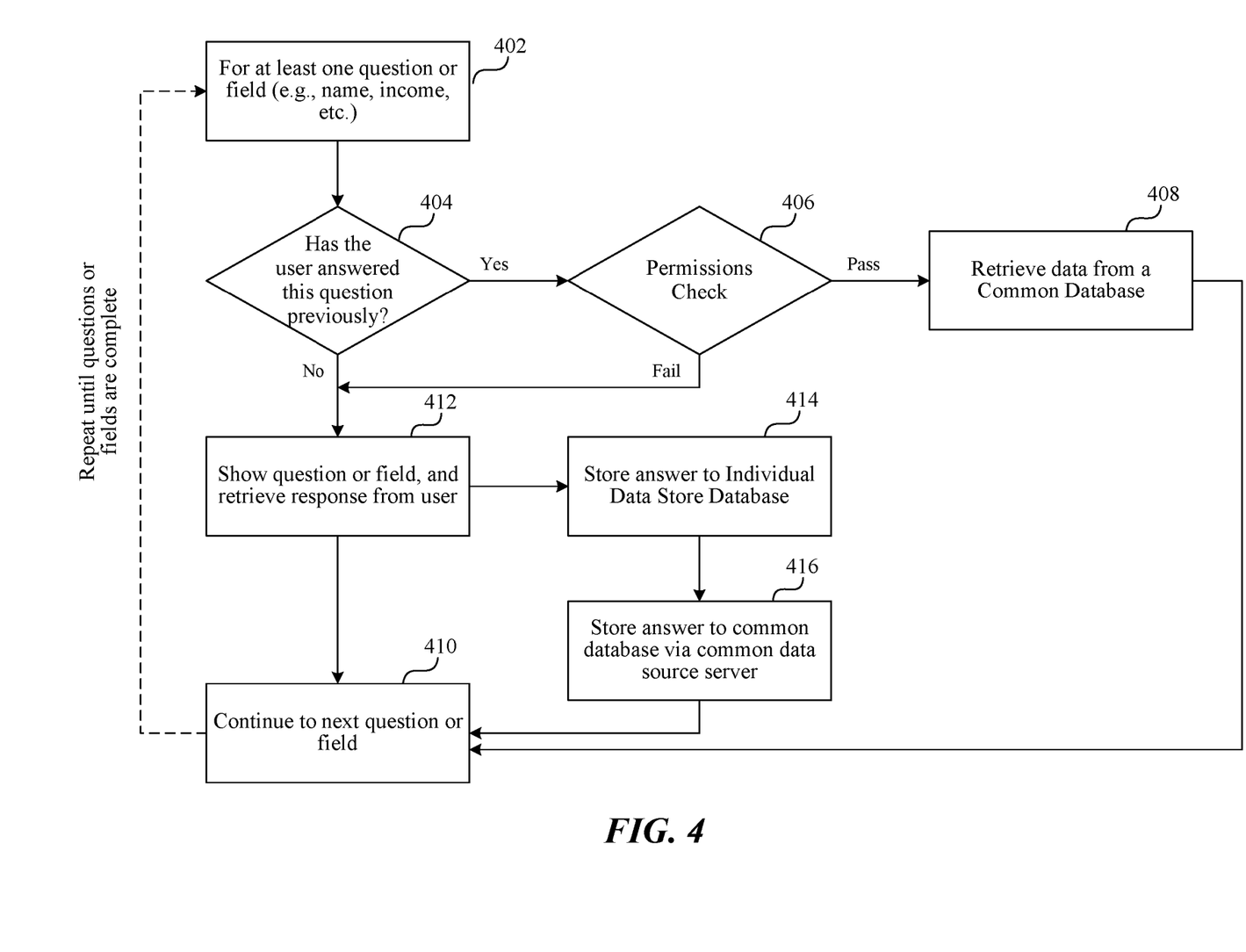
FIG. 4 shows a flow diagram that describes two or more servers obtaining relevant previously collected user data from a common database.

FIG. 4 shows a flow diagram that describes two or more servers obtaining relevant previously collected user data from a common database. For example, each of the first and second servers 306, 310 of FIG. 3 can perform at last some operations shown in FIG. 4 based on the plurality of categories of information associated with an application for a product. Each of the first and second servers 306, 310 may obtain fields for each category of information. Each of the first and second servers 306, 310 can perform operations 402, 410, 412, 414, 416 as described below for each field for each category of information. However, for simplicity, an application server is used to describe the operations performed by each of the first and second servers 306, 310 since both these servers can separately or independently perform the described operations. Furthermore, as indicated by the dashed line on the left side of FIG. 4, the operations described in FIG. 4 can be repeated for each field for each category of information.

At operation 402, an application server can send to a common data source server a first message that requests stored data of the user for a field. The first message can include the field and an identifying information of the user.

At operation 404, the common data source server receives the first message that includes the field and the identifying information of the user and determines whether the user associated with the identifying information has previously answered the question. The common data source server can determine, based on the received field and the received identifying information, that the data stored in the common database includes a stored data of the user for the field. If the common data source server determines that the stored data exists for the user for the field, the common data source server may proceed to operation 408, or it may optionally proceed to operation 408 after performing operation 406.

At operation 406, the common data source server may optionally perform a permissions check to determine whether it can send stored data for the user to the application server. In some embodiments, certain user data may be considered confidential or sensitive, where such data may not be sent to the application server to pre-fill the application form for a user or can only be sent to certain other servers based on permissions given by the user. In such embodiments, the common data source server may send a message to the application server indicating that the user is required to or should be requested to provide user data for a field considered confidential or sensitive. Thus, at operation 406, if common data source server determines that it is permitted to send previously stored user data for the field to an application server, then the common data source server can proceed to operation 408.

At operation 408, the common data source server retrieves the user data from the common database and sends the user data to the application server. As mentioned above, operation 408 can be performed after operation 404 or after operation 406. Thus, at operation 408, the common data source server sends a message to an application server in response to performing the operation 404 and/or operation 406, where the sent message includes the stored data of the user for the field.

At operation 410, the application server can receive the message sent by the common data source server as part of operation 408. At operation 410, the application server can determine whether additional fields need to be processed in a manner described in FIG. 4. If additional fields exist, the application server 410 may initiate process of FIG. 4 by performing operation 402.

Returning to operation 404, if the common data source server determines that the common database does not include data for a field for a user, then the common data source server can send a message to the application server indicating that the user is required to or should be requested to provide user data for the field. And, in the optional operation 406, if common data source server determines that it is not permitted to send previously stored user data for the field to an application server, then the common data source server may send a message to the application server indicating that the user is required to or should be requested to provide user data for a field considered confidential or sensitive.

At operation 412, an application server receives the message from the common data source server from operation 404 or operation 406, where the message indicates that the user is required to or should be requested to provide user data for a field. Accordingly, the application server can send another message to the user device used by the user to request the user data for the field. When the user inputs his or her user data for that field, the obtained user data is stored on the individual database (e.g., 308 or 312 in FIG. 3) related to the application server. At operation 416, the application server can also send the user data obtained from the user to the common data source server to be stored on the common database. After operations 412 or 416, the application server can perform operation 410 as described above.

II. Time of Completion

Section I describes data processing techniques to efficiently obtain relevant previously collected user data from a common database and to request from a user certain user information that is not previously stored or that cannot be retrieved from the common database. By performing the data processing techniques described in Section I, an application server can obtain information to determine or estimate a time that likely will be needed by a user to complete at least one application form for the user to obtain the requested product.

By performing the operations described in FIG. 4, an application server can determine a first number of fields for which user data is retrieved from a common database (e.g., from operation 408), and the application server can determine a second number of fields for which user data could not be retrieved from the common database (e.g., from operations 404 and/or 406). The application server can estimate time of completion of an application form for a product requested by the user by using the first and second number of fields along with information related to a demographic group to which the user belongs, as explained below.

In some embodiments, the common database may include previously stored demographic group information about a user that can be retrieved by the application server based on an identifying information provided by the user. The demographic group information may be associated with an estimate of a time needed to compete various application forms for people belonging to different groups. For example, if person belonging to an age group (e.g., 25-35) or status (e.g., spouse) is requesting to open a credit card, the application server obtain a time needed to complete a credit card application based on a demographic group associated with the person, where the demographic group information can be based on the identifying information provided to the common data source server. A common data source server can determine previously stored demographic group information (e.g., age group, status) of the person based on the identifying information. In an example, many people do not know their spouse's social security number and thus based on a user's status as a spouse, more time can be allocated to a portion of the application based on a status. Furthermore, the common data source server can, based on an application form that the person is required to complete, obtain a time of completion associated with the stored demographic group information for that application. In some embodiments, the time of completion may describe a total time that a user needs to complete an application form without having any of the fields pre-filled by the user data retrieved from the common data source server.

Based on the first number of fields, the second number of fields, and the time of completion obtained from the demographic group information, an application server can determine a revised time needed to complete an application form requested by a user. The application server can send the revised time of completion to the user device used by a user to complete the application form. The user device can be configured to receive and display the revised time of completion on a display.

Figure 5A:
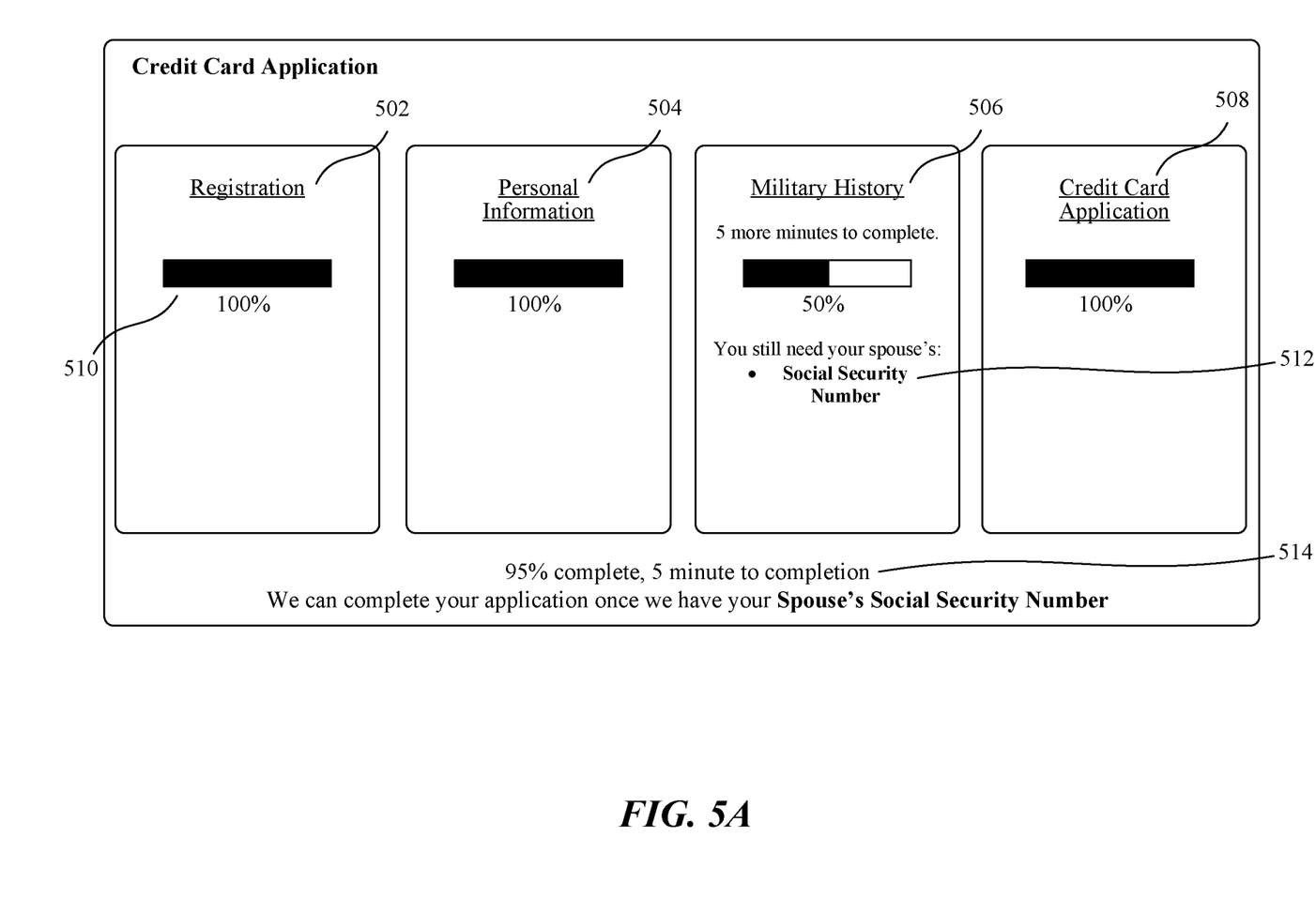
FIGS. 5A and 5B show some examples of graphical user interface (GUI) that can be displayed to a user on a user device based on information sent to the user device from an application server.
Figure 5B:
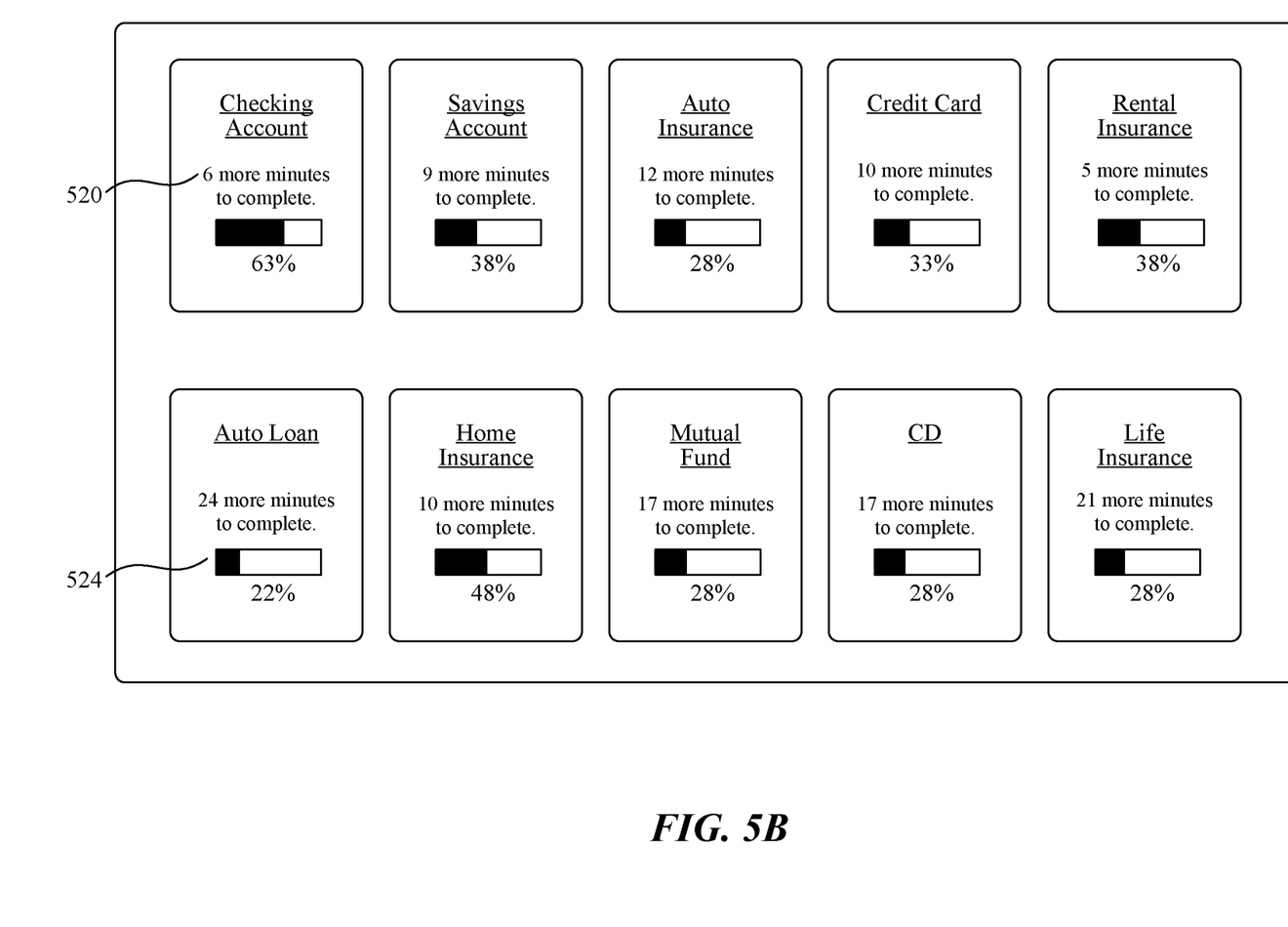

In some embodiments, the data processing techniques described in Section II can also be used to provide an estimate of the time needed by a user to complete additional application that may not be requested by a user. Such a feature can be beneficial at least because a user can be provided with information about the times needed to complete additional application forms not requested by a user based on information obtained for an application form that is requested by a user. For example, if a user has requested to complete a credit card application, the techniques described in Section II can be used to provide a user with a time needed to complete not only the credit card application, but also other application forms such as life insurance application, automobile loan application, mutual fund application, etc. As further described below, FIG. 5A shows an examples of GUI that include the time of completion related information for an application form that is requested by a user for a product, and FIG. 5B shows an example of GUI that includes of multiple times of completion estimates for applications not necessarily requested by a user.

In embodiments where a time of completion estimate is provided for additional applications not be requested by a user, an application server can determine a first number of fields for which user data is retrieved from a common database (e.g., from operation 408). The application server can also obtain from one or more additional application servers a second number of fields that describe a total number of fields associated with an additional application form for an additional product. As described above in Section II, the application server can obtain from a common data source server a time of completion needed to complete the additional application form, where the time of completion is based on a demographic group information associated with an identifying information. Thus, the application server can calculate a revised time to complete the additional application form based on the first number of fields, the second number of fields, and the time of completion related to the demographic group information. The application server can send the revised time to a user device to be displayed on the user device for the additional application form.

III. Graphical User Interface (GUI)

The data processing techniques described in Sections I and/or II can be used to provide meaningful information to a user via a user device and to use less processing power as data is shared more efficiently between different servers. FIGS. 5A and 5B show some examples of GUI that can be displayed to a user on a user device based on information sent to the user device from an application server. For example, FIG. 5A shows an example GUI that provides a progress bar related information 510 for each category of information and an estimated time 514 needed to complete the credit card application of completion. FIG. 5B shows another example GUI that provides a progress bar related information 524 and an estimated time 520 needed to complete one or more application forms that are not yet requested by the user.

The information displayed in FIG. 5B can be beneficial as it provides a user with information that can encourage a user to start and complete an application that has not yet been requested by the user. For example, on the top left of FIG. 5B, the information presented on the GUI on a user device shows that the user needs only 6 more minutes to complete a checking account related application form and that 63% of the information needed for the checking account application form is completed because it can be retrieved from a common database. In some embodiment, the GUIs shown in FIGS. 5A and 5B can be displayed after a user enters his or her login and password information in a website to access his or her account.

FIGS. 5A and 5B also show the revised time value for each application form as information from the user is collected for completion of an application. As shown in FIG. 5A, a user device displays on a GUI a revised time 514 to complete the application form requested by the user, where the revised time is calculated and send by an application server as described in Section II. In FIG. 5B, a user device displays on a GUI a revised time 520 calculated and sent by the application server. In some embodiments, the calculation of a time of completion of an application form requested by a user and for the application forms not yet requested by the user (as described in Section II), and the calculation of the progress bar related information for the application form requested by a user and for the application forms not yet requested by the user (as described in Section III) may be simultaneously calculated by an application server as a user adds his or her user data to an application. A benefit of such a technique is that is provides real-time update of the progress bar related information and time of completion values for the various application forms.

An application server can send relevant information to a user device to be displayed on a GUI as shown in FIGS. 5A and 5B. For example, an application server can send to the user device information related to an application form requested by a user for a product. The information related to the application can includes the plurality of categories of information (shown as 502, 504, 508, 508 in FIG. 5A), and/or the one or more fields for each category of information.

The application server can also determine and send progress bar related information (510 in FIG. 5A) to a user device. In some embodiments, the progress bar related information can be provided for each category of information as shown in FIG. 5A. An application server can calculate a plurality of values that can describe an amount of user data obtained about the user for the categories of information associated with the application form. In some embodiments, for at least one category of information, a calculated value can be based on a number of fields for which user data can be retrieved from a common database compared to a total number of the one or more fields that category. For example, as shown in FIG. 5A, if the military history category 506 requires two fields and if one of the fields can be obtained from a common database, then the application server can calculate and send a value that indicates that 50% of the information required for that category has been obtained.

In some other embodiments, the progress bar related information can be provided using a total number of fields from all of the categories of information as shown in FIG.

5B and in the bottom section of FIG. 5A (e.g., "95% complete"). In such embodiments, an application server can calculate a progress bar related value based on a number of fields for which user data can be retrieved from a common database for all of the categories of information compared to a total number of the one or more fields for all of the categories of information. For example, if an application form requires a total of 50 fields to be completed from all of the categories of information, and user data for 11 of those fields can be retrieved from a common database, then the application server can determine that a progress bar value can be 22% (shown as 524 in FIG. 5B). Not all fields are estimated with the same time estimate. For example, the field of a spouse's social security number can be associated with double the amount of time as the field of the applicant's social security number. In some implementations, the percentage complete is based solely on the number of data fields remaining to complete the application. In other implementations, the percentage complete is further or solely based on a time remaining to complete the application.

In some embodiments, the application server can send to the user device the stored data received from the common data source server. The application server can also send to the user device a set of one or more fields for which user data is not received from the common data source server. By obtaining information for which a user is required to or should be requested to provide user data for a field, a user device can display such information to a user. For example, as shown in FIG. 5A, a GUI on a user device may display that a user needs to enter a spouse's social security number 512 because such information may not be readily available.

In some embodiments, a user may opt to save his or her incomplete application so that the user may complete the application at a later time. In such embodiments, the application server that communicates with the user device associated with the user may periodically save to an individual database the user data obtained from the user and/or user data retrieved from a common database. In some embodiments, the application server may save the above described user data in response to receiving an indication from a user device (e.g., a user hitting a save button or a user closing a web browser).

Figure 6:
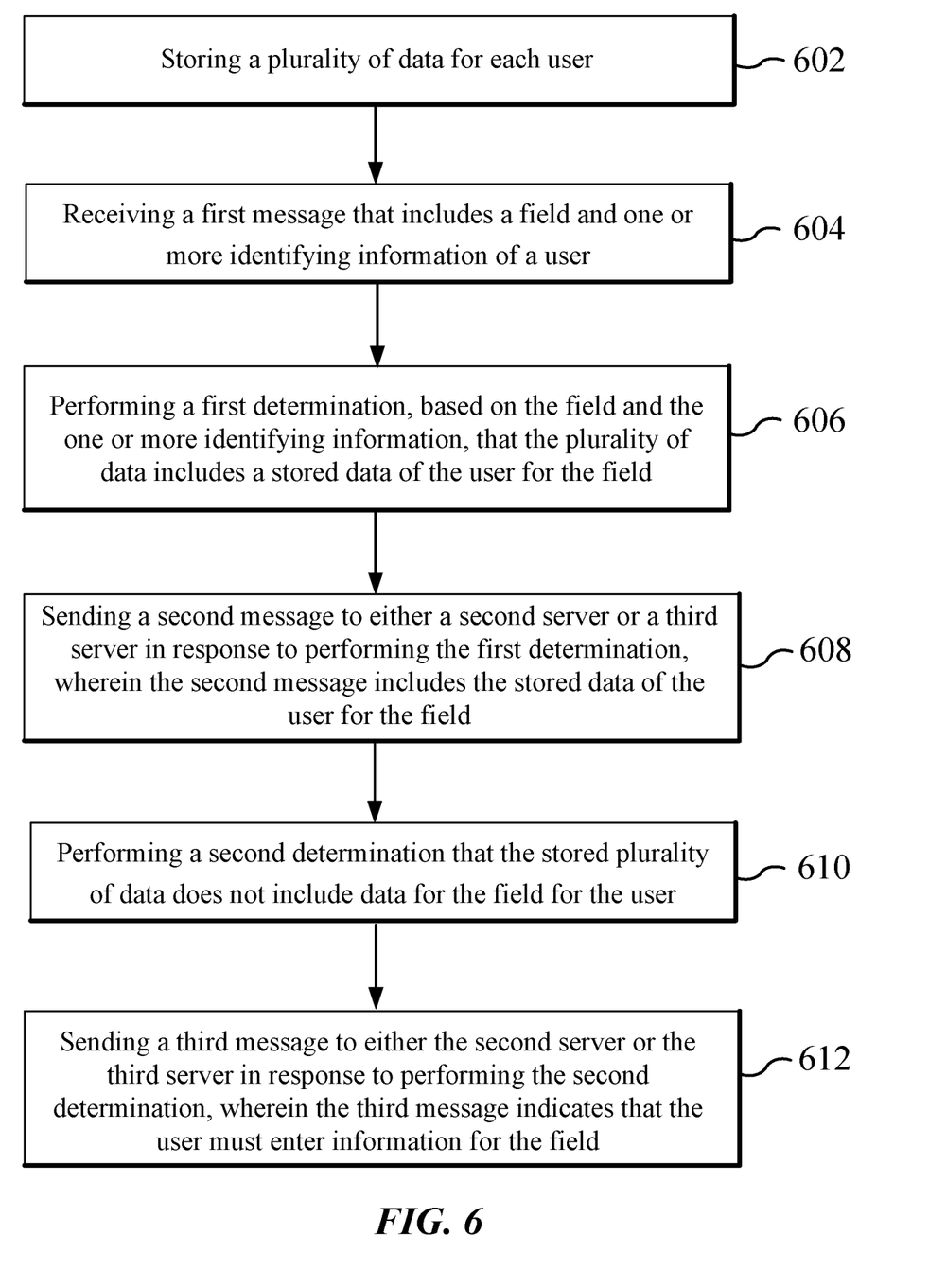
FIG. 6 shows an example flow diagram of operations performed by a common data source server.

FIG. 6 shows an example flow diagram of operations performed by a common data source server. At the storing operation 602, the common data source server stores a plurality of data for each user, where each data is stored with a field that describes each data.

At the receiving operation 604, the common data source server receives a first message from either a first server or a second server, where the first message includes a field and one or more identifying information of a user. At the performing operation 606, the common data source server performs a first determination, based on the field and the one or more identifying information, that the plurality of data includes a stored data of the user for the field.

At the sending operation 608, the common data source server sends a second message to either the second server or the third server in response to performing the first determination. The second message includes the stored data of the user for the field. At the performing operation 610, the common data source server performs a second determination that the stored plurality of data does not include data for the field for the user. At the sending operation 612, the common data source server sends a third message to either the second server or the third server in response to performing the second determination. The third message indicates that the user must enter information for the field.

Figure 7:
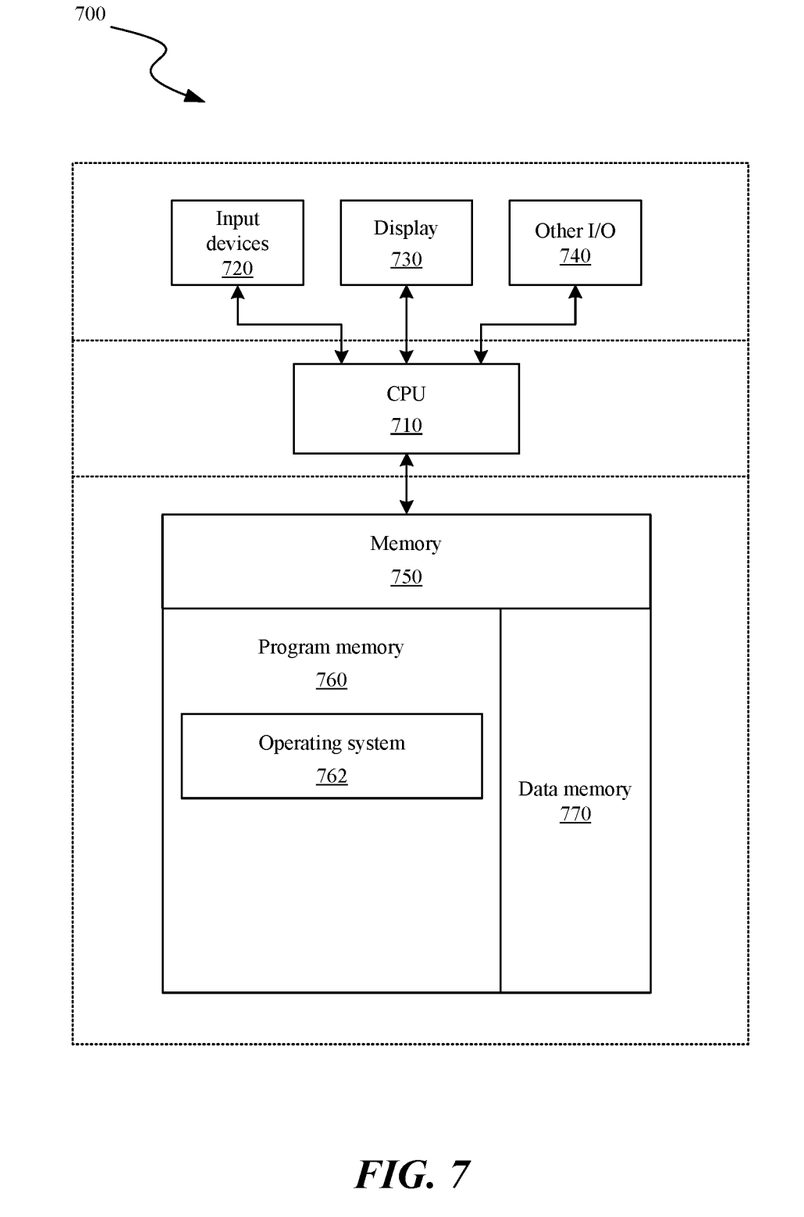
FIG. 7 is a block diagram illustrating an overview of devices on which some implementations of the disclosed technology can operate.

FIG. 7 is a block diagram illustrating an overview of devices on which some implementations of the disclosed technology can operate. The devices can comprise hardware components of a device 700, such as the common data source server or the application server(s) (e.g., the first and/or second servers of FIG. 3) or a user device (e.g., a mobile device, a computer, or a laptop). Device 700 can include one or more input devices 720 that provide input to the CPU (processor) 710, notifying it of actions. The actions are typically mediated by a hardware controller that interprets the signals received from the input device and communicates the information to the CPU 710 using a communication protocol. Input devices 720 include, for example, a mouse, a keyboard, a touchscreen, an infrared sensor, a touchpad, a wearable input device, a camera- or image-based input device, a microphone, or other user input devices.

CPU 710 can be a single processing unit or multiple processing units in a device or distributed across multiple devices. CPU 710 can be coupled to other hardware devices, for example, with the use of a bus, such as a PCI bus or SCSI bus. The CPU 710 can communicate with a hardware controller for devices, such as for a display 730. Display 730 can be used to display text and graphics. In some examples, display 730 provides graphical and textual visual feedback to a user. In some implementations, display 730 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 700 also includes a communication device capable of communicating wirelessly or wire-based with a network node (e.g., a server) or with a user device (e.g., a laptop, desktop, or mobile device). The communication device can communicate with another device or a server through a network using, for example, TCP/IP protocols. Device 700 can utilize the communication device to distribute operations across multiple network devices.

The CPU 710 can have access to a memory 750. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 760 that stores programs and software, such as an operating system 762. The memory 750 may have instructions stored thereupon. The instructions upon execution by the CPU 710 configure the device 700 to perform the operations described in FIGS. 2 to 6 and in the various embodiments described in this patent document. Thus, for example, the memory 750 may store instructions that upon execution by CPU 710 configure the device 700 to perform the operations described for the common data source server as described in FIGS. 3, 4, and 6 and/or in the various embodiments described in this patent document. In another example, the memory 750 may store instructions that upon execution by CPU 710 configure the device 700 to perform the operations described for the application server as described in FIGS. 3 to 6 and/or in the various embodiments described in this patent document. Memory 750 can also include data memory 770 that can include the user data obtained from or sent to a common database, which can be provided to the program memory 760 or any element of the device 700.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Those skilled in the art will appreciate that the components illustrated in FIG. 1-7 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system, comprising:
   one or more processors; and
   one or more memories storing instructions that, when executed by the one or more processors, cause the system to perform a process comprising:
   receiving, from a user device, one or more identifying information about a user and an indication that a user requests an application form for a product;
   storing a plurality of categories of information to obtain about the user, wherein the plurality of categories of information is related to the application form requested by the user, and each category of information includes one or more fields;
   for each of the one or more fields for each category of information:
      sending, to a server, a first message that requests stored data of the user for fields of the application form, wherein the first message includes the field and the one or more identifying information;
      receiving, from the server, a second message that includes stored data of the user for a first set of the fields and indicates that the user must enter information for a second set of the fields;
   calculating an amount of time needed by the user to enter the information into the second set of the fields based on a demographic group of the user, wherein the demographic group is associated with the one or more identifying information of the user;
   determining a progress completion indicator for completing the requested application form based on the amount of time, the first set of the fields, and the second set of the fields; and
   sending, to the user device, the progress completion indicator.

2. The system of claim 1, wherein the process further comprises:
   sending, to the user device, information related to the application form, wherein the information includes:
      the plurality of categories of information,
      the one or more fields for each category of information,
      a plurality of values that describe an amount of user data obtained about the user for the plurality of categories of information, wherein each value is based in part on a number of fields associated with the received second message for each category of information,
      the stored data received from the server, or
      a set of one or more fields for which the second message is received.

3. The system of claim 2, wherein the process further comprises:
   receiving and displaying the information related to the application form;
   receiving one or more user data for a second set of one or more fields; and
   sending the one or more user data to either a second server or a third server.

4. The system of claim 1, wherein the process further comprises:
   determining a first number of fields associated with the received second message;
   obtaining, from at least one additional server, a second number of fields needed to complete at least one additional application form for at least one additional product;
   obtaining a first time that describes a first time amount needed to complete the at least one additional application form for the demographic group associated with the one or more identifying information of the user;
   calculating a second time that estimates a second time amount needed to complete the at least one additional application form, wherein the second time is based on the first number of fields, the second number of fields, and the first time; and
   sending the second time for the at least one additional application form to the user device.

5. The system of claim 1, wherein the process further comprises:
   perform, after receiving the first message, a third determination that the server is permitted to send information for the fields in the first message.

6. The system of claim 1, wherein the one or more identifying information includes a password or a login information, and wherein the progress completion indicator includes a progress bar or a value for the amount of time needed to complete the application form.

7. A method comprising:
   storing, by a first server, a plurality of data for each user;
   receiving a first message that includes a field and one or more identifying information;
   performing a first determination based on the field and the one or more identifying information that the plurality of data includes a stored data of a user for the field;
   sending a second message to either a second server or a third server in response to performing the first determination,
      wherein the second message includes the stored data of the user for the field;
   performing a second determination that the stored data does not include data for the field for the user;
   sending a third message to either the second server or the third server in response to performing the second determination,
      wherein the third message indicates that the user must enter information for the field;
   calculating an amount of time needed by the user to enter the information into the field based on a demographic group of the user, wherein the demographic group is associated with the one or more identifying information of the user;

determining a progress completion indicator for completing an application form based on the amount of time and the field; and sending the progress completion indicator.

8. The method of claim 7, further comprising:

performing, after receiving the first message, a third determination that the first server is permitted to send information for the field in the first message; and wherein the second message is sent to either the second server or the third server in response to performing the first determination and the second determination.

9. The method of claim 7, wherein the one or more identifying information includes a password or a login information, and wherein the progress completion indicator includes a progress bar or a value of the amount of time needed to complete the application form.

10. A method, comprising:

receiving, from a user device, one or more identifying information about a user and an indication that a user requests an application form for a product;

storing a plurality of categories of information to obtain about the user, wherein the plurality of categories of information is related to the application form requested by the user, and each category of information includes one or more fields;

for each of the one or more fields for each category of information:

sending, to a server, a first message that requests stored data of the user for fields of the application form, wherein the first message includes the fields and the one or more identifying information;

receiving, from the server, a second message that includes stored data of the user for a first set of the fields and indicates that the user must enter information for a second set of the fields;

calculating an amount of time needed by the user to enter the information into the second set of the fields based on a demographic group of the user, wherein the demographic group is associated with the one or more identifying information of the user;

determining a progress completion indicator for completing the requested application form based on the amount of time, the first set of the fields, and the second set of the fields; and sending, to the user device, the progress completion indicator.

11. The method of claim 10, further comprising:

sending, to the user device, information related to the application form, wherein the information includes:

the plurality of categories of information, the one or more fields for each category of information, a plurality of values that describe an amount of user data obtained about the user for the plurality of categories of information, wherein each value is based in part on a number of fields associated with the received second message for each category of information, the stored data received from the server, or a set of one or more fields for which the second message is received.

12. The method of claim 11, further comprising:

sending a value of the amount of time to the user device, wherein the user device is configured to receive and display the value.

13. The method of claim 10, further comprising:

determining a first number of fields associated with the received second message;

obtaining, from at least one additional server, a second number of fields needed to complete at least one additional application form for at least one additional product;

obtaining a first time that describes a first time amount needed to complete the at least one additional application form for the demographic group associated with the one or more identifying information of the user; and calculating a second time that estimates a second time amount needed to complete the at least one additional application form, wherein the second time is based on the first number of fields, the second number of fields, and the first time.

14. The method of claim 13, further comprising:

sending the second time for the at least one additional application form to the user device, wherein the user device is configured to receive and display the second time for the at least one additional application form.

15. The method of claim 10, wherein the one or more identifying information includes a password or a login information, and wherein the progress completion indicator includes a progress bar or a value of the amount of time needed to complete the application form.

* * * * *